United States Patent
Ngo

[15] 3,645,604
[45] Feb. 29, 1972

[54] LIQUID CRYSTAL DISPLAY

[72] Inventor: Dinh-Tuan Ngo, Colts Neck, N.J.

[73] Assignee: Bell Telephone Laboratories, Incorporated, Murray Hill, N.J.

[22] Filed: Aug. 10, 1970

[21] Appl. No.: 62,282

[52] U.S. Cl. ............................................. 350/160, 40/52
[51] Int. Cl. ......................................... G02f 1/28, G09f 11/00
[58] Field of Search ............... 350/160; 340/324 R, 166 EL; 40/52

[56] References Cited

UNITED STATES PATENTS 3,499,112   3/1970   Heilmeier et al. ................... 350/160

*Primary Examiner*—Ronald L. Wibert
*Assistant Examiner*—V. P. McGraw
*Attorney*—R. J. Guenther, Kenneth B. Hamlin and R. J. Guenther

[57] ABSTRACT

An improved liquid crystal display is disclosed in which a multilevel gray scale is provided by stacking a plurality of conventional liquid crystal display devices and addressing the respective display devices in selected combinations. Successive display devices in the stack are of different thicknesses or of different material composition, such that with like magnitude signals applied thereto, each display scatters light by a different predetermined amount. A single addressing circuit is employed in common for all of the display devices, with respective bits of a multibit gray scale codeword determining the energization of the individual display devices in the stack.

12 Claims, 3 Drawing Figures

Patented Feb. 29, 1972  3,645,604

INVENTOR
D. NGO
BY
D. E. Snedeker
ATTORNEY

LIQUID CRYSTAL DISPLAY

BACKGROUND OF THE INVENTION

This invention relates to displays, and more particularly, to displays upon which images are generated by the selective energization of individual display cells or elements.

Displays are typically used for generating patterns of information or images in a two-dimensional raster for information display media, television, radar, computer input/output terminals, and the like. Displays currently available principally include cathode-ray tube presentations which suffer from well-known disadvantages related to size, cost, ruggedness and power requirements. The need for a display which would overcome these disadvantages has been apparent for some time, and considerable effort has been expended toward achieving such a display.

Currently, one area of considerable promise appears to be liquid crystal displays of the type generating display images through the dynamic scattering of light in liquid crystal material. Liquid crystal displays comprise a plurality of liquid crystal display cells which may be individually energized by an electrical signal or field applied thereto. A cell is relatively transparent to light when in a deenergized or unexcited state, and when energized or excited by the application of an electric field, the cell scatters light due to turbulence developed in the energized region of the liquid crystal material. Increasing the magnitude of the applied field results in increased light scattering, such that a gray scale is obtainable by modulation of the field applied to the individual cells.

In addition to various known analog modulation arrangements, time division multiplexing arrangements have been proposed for providing such displays with gray scale by varying the duty cycle, that is, by energizing the individual display cells for varying durations during each scanning frame. However, such known arrangements have so far proven to be too costly and complex from a manufacturing standpoint.

SUMMARY OF THE INVENTION

It is accordingly an object of this invention to provide a new and improved liquid crystal display having a multilevel gray scale.

A further object of this invention is to provide a new and improved gray scale liquid crystal display which alleviates the disadvantages of known addressing and control arrangements.

Yet another object of the present invention is to provide a gray scale liquid crystal display adapted for coincident signal addressing which exhibits greater contrast and higher resolution than known coincident signal addressed arrangements.

A conventional liquid crystal display device typically comprises a coordinate array of cross-point display cells defined by row and column conductors. The row and column conductors are spaced apart on first and second substrates having a thin layer of nematic liquid crystal material disposed therebetween. According to a feature of my invention, the above and other objects are attained in a simple and economical manner in an illustrative embodiment of a gray scale liquid crystal display by stacking a plurality of liquid crystal display devices, which may be of different predetermined thicknesses and/or of different materials, and addressing the respective display devices in selected combinations. Consequently, by selecting the liquid crystal material and thickness of the respective devices in the stack, each device exhibits different predetermined degrees of light scattering with fixed magnitude signals applied thereto. Thus, a $2^n$ level gray scale display is achieved in accordance with my invention by addressing individual ones of a stack of $n$ display devices with fixed magnitude signals, advantageously eliminating the requirement in known arrangements for modulation circuitry.

An important advantage of a liquid crystal display in accordance with my invention is that addressing and gray scale control may be effected via a single conventional element or line-at-a-time coincident signal addressing circuit employed in common for all display devices in the stack, with each bit of an $n$-bit gray scale codeword determining the energization or ON/OFF character of the respective display devices. Consequently, since the various gray scale levels are provided by energizing combinations of display cells, rather than by modulation of the signals applied to the individual cells, greater contrast and higher resolution is obtainable than with known coincident signal addressed liquid crystal displays. Moreover, a gray scale display according to my invention is compact and reliable and is significantly less expensive to manufacture and operate than known gray scale liquid crystal display arrangements. In addition, my invention is particularly suited to color television applications by the use of appropriate filter dot clusters in registration with respective cells of the display devices.

BRIEF DESCRIPTION OF THE DRAWING

The above and other objects and features of the invention may be fully apprehended from the following detailed description and the accompanying drawing in which.

DETAILED DESCRIPTION

Figure 1:
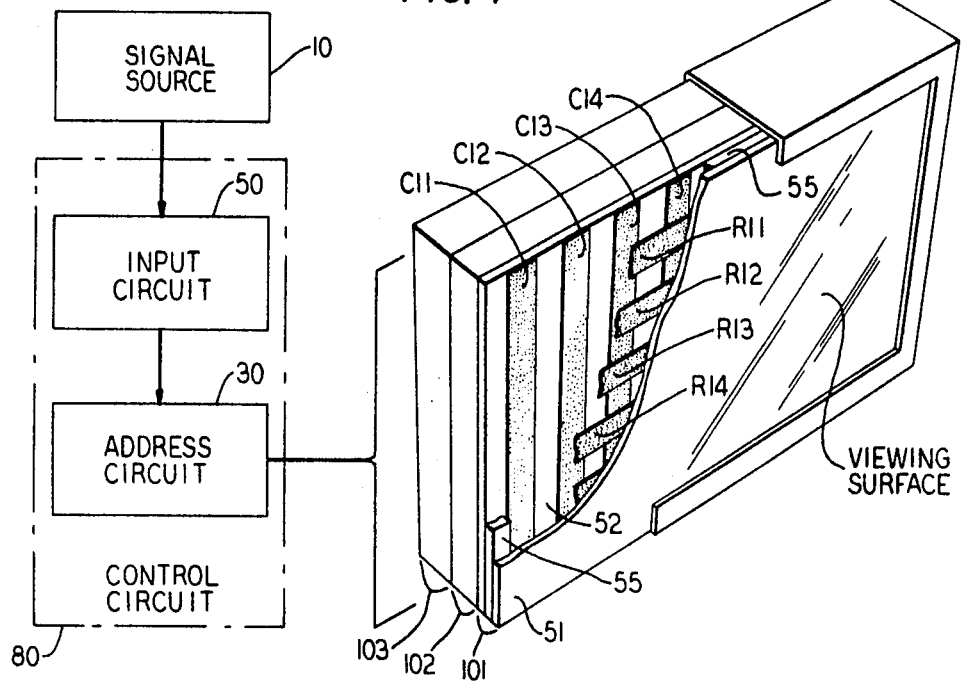
FIG. 1 is a diagram of an illustrative embodiment of a liquid crystal display arrangement providing a multilevel gray scale in accordance with the principles of my invention.

In FIG. 1 of the drawing an illustrative liquid crystal display embodiment of the invention is shown comprising a stack of conventional liquid crystal display devices 101, 102 and 103 for generating mural images by the selective energization of individual ones of the cross-point display cells of each device. Illustratively, in FIG. 1 the three display devices 101, 102 and 103 each comprise a coordinate array of cross-point display cells, the display cells of each device being substantially in registration with the corresponding display cells of the other display devices in the stack. However, it will be apparent from the description herein that the display cells may be employed in any form of array desired for particular display applications; for example, the display cells may be arranged in spiral rows or in concentric circles for radar display applications.

The cross-point display cells of each display device are defined by respective sets of row and column conductors, such as row conductors R11–R14 and column conductors C11–C14 of device 101 shown in FIG. 1, which are illustratively disposed on substrates, such as substrates 51 and 52. Substrates 51 and 52 are in turn spaced apart, such as by spacers 55, and a substantially uniform layer of liquid crystal display material 53 is disposed therebetween.

Display devices 101, 102 and 103 each utilize the dynamic scattering of light in the liquid crystal material regions at selected cross-point display cells for generating images. With no signal applied, the liquid crystal material is quiescent and substantially transparent. When an electric field is applied across a cross-point display cell, such as the cell defined by row conductor R12 and column conductor C14 of device 101, of a threshold magnitude determined by the particular liquid crystal material employed and by the thickness of the material between the cross-point conductors, the liquid crystal material in the cross-point region 220 becomes turbulent and scatters light incident thereon, rendering the material opaque. Removing the applied signal returns the material to its quiescent, transparent condition.

Figure 2:
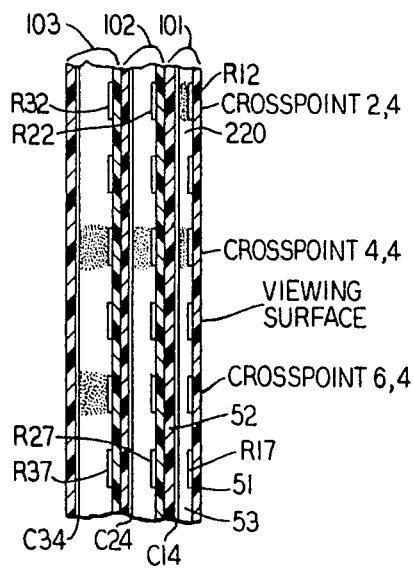
FIG. 2 shows a portion of the display embodiment of FIG. 1 in cross section.

The light source (not shown in the drawing) may be located in back of or in front of the display, depending upon the mode of operation chosen, whether transmissive, absorptive or reflective. The reflective mode of operation is generally preferred for display applications, often with ambient light serving as the light source, a reflective backplate typically being located at the back of the display facing the viewing surface. Thus, in FIG. 2 the reflective backplate would be located to the left of device 103 with the reflective surface thereof facing to the right.

A selected display cell of a particular display device in the stack is addressed via address circuit 30 under control of control circuit 80, illustratively herein by the application of coincident signals to the particular row and column conductors defining the selected display cell. The voltage thus extended across the selected display cell by the coincident row and column signals is above a threshold level sufficient to cause light scattering turbulence in the liquid crystal material at the selected cell. At the same time, however, the voltage extended across the other display cells connected to the addressed row and column conductors is insufficient to cause significant light scattering at these other cells. If the magnitude of the signal applied across the display cell is increased, the turbulence and thus the light scattering caused thereby increases. In known liquid crystal display devices, this direct relationship between the applied signal magnitude and the degree of light scattering (and hence cell opaqueness) is used to provide gray scale, typically via modulation of the signals applied to the individual display cells. However, in accordance with the present invention, gray scale is provided advantageously by applying signals of a fixed predetermined magnitude to the individual display cells, eliminating the heretofore requirement for modulation and digital-to-analog conversion circuitry. As mentioned above, the liquid crystal material is of different thickness in the respective display devices 101, 102 and 103, such that with like magnitude signals applied thereto the cells of each device provide different degrees of light scattering. For example, assuming the reflective mode of operation, the different degrees of light scattering may be such that device 101 is provided with a light reflectance coefficient of $k$, device 102 with a light reflectance coefficient of $k^2$, and device 103 with a light reflectance coefficient of $k^4$. Consequently, gray scale levels substantially corresponding to the standard television gray scales (RETMA Resolution Chart 1956) may be provided by selecting the respective display device thicknesses such that $k$ corresponds to the ratio between adjacent gray scales, illustratively on the order of 0.69.

It will be appreciated, therefore, that at a selected cross-point on the viewing surface of the embodiment of FIG. 1, the light presented to the viewer via display devices 101, 102 and 103 is controllable over an eight-level gray scale (e.g., a range of zero to seven) by energization of the selected cross-point in various combinations of the display devices in the stack. For example, with the assumed reflective mode of operation, light incident on the viewing surface at cross-point 4,4 in FIG. 2, due to energization of devices 101, 102 and 103 at that cross-point, would be scattered to the maximum degree attainable (e.g., a level of seven); while that at cross-point 6,4 due to the energization of device 103 at that cross-point would be the next-to-lowest level (e.g., a level of one); and the light at cross-point 2,4 due to energization of device 101 at that cross-point would be in the middle of the range (e.g., a level of four).

Addressing of the individual cross-point display cells in FIG. 1 may be effected via conventional addressing or scanning techniques, such as those known to the display and television art, advantageously employing a single address circuit 30 in common for all the display devices in the stack. As corresponding cross-point cells of devices 101, 102 and 103 are addressed in common, the cells of the respective devices at the addressed cross-point are selectively energized in accordance with a gray scale input signal received by input circuit 50 from signal source 10. The gray scale input signal may be in analog form as is usual in commercial television, but preferably it is in the form of a multibit digital word with respective bits of the word determining the energization or ON/OFF character of the individual display device cells at an addressed cross-point. If the signals from source 10 are received in analog form, control circuit 80 must be provided with analog-to-digital encoding circuitry to place the signals in digital form for energizing the individual display cells of devices 101, 102 and 103.

Figure 3:
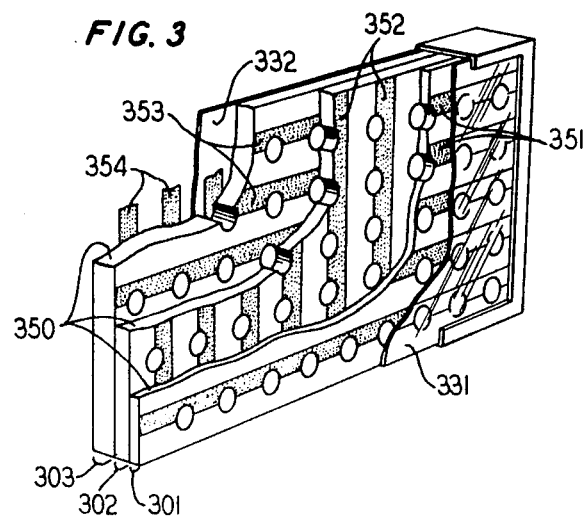
FIG. 3 is an alternative illustrative embodiment of a display according to my invention.

An alternative display embodiment is shown in FIG. 3, wherein each display device 301, 302 and 303 comprises a layer of dielectric material 350 having holes disposed therein filled with liquid crystal material to define an array of multilevel display cells. The display devices are disposed in housing 330 having a transparent viewing surface 331 and a backplate 332. Corresponding cells of the several devices in the stack are substantially in registration with one another, the holes of the devices thus being aligned and advantageously filled with the same liquid crystal material. As depicted illustratively in the embodiment of FIG. 3, the row and column conductors, except for the outermost sets of conductors, are each shared by two adjacent display devices in the stack. Thus, column conductors 352 are shared by display devices 301 and 302, and row conductors 353 are shared by devices 302 and 303. An arrangement of $n$ display devices therefore would require only $n+1$ sets of conductors interleaved with the display device levels, alternating between row conductors and column conductors such as shown in FIG. 3. This arrangement advantageously facilitates manufacture by significantly reducing the number of sets of conductors and, consequently, the number of connections which must be made to the display devices. Moreover, the embodiment of FIG. 3 permits closer spacing between display device levels in the stack than the embodiment of FIG. 1.

The dielectric material layers 350 may comprise any of the well-known dielectric materials and need not be transparent since the liquid crystal material is disposed in holes therein. The sets of conductors 351, 352, 353 and 354 may be disposed on the dielectric material layers as depicted and, similarly, need not be transparent. The conductors are disposed on layers 350 such that the display cell holes are adjacent, or partially or wholly within, the respective row-column conductor intersections. The advantages of the arrangement of FIG. 3 relative to facilitating manufacture are manifest. Moreover, with the arrangement of FIG. 3, the uniformity of the row-column conductor spacing of the display device cells, that is, the thickness of the liquid crystal material of the cells, is more readily assured and maintained than with the arrangement of FIG. 1.

The display embodiments depicted in the drawing are assumed to employ different thicknesses of the same liquid crystal material in each of the display devices. However, in accordance with the principles of my invention, like thicknesses of different liquid crystal materials, or combinations of different materials and different thicknesses, may be employed in the respective display devices in the stack to provide gray scale using like magnitude signals applied thereto. Alternatively, according to the invention, different predetermined magnitude signals may be applied to the respective devices in the stack, with the devices employing like thicknesses of the same liquid crystal material. It is understood, therefore, that the above-described arrangements are but illustrative of the application of the principles of my invention. Numerous other arrangements may be devised by those skilled in the art without departing from the spirit and scope of the invention.

What is claimed is:

1. A display comprising a stack of liquid crystal display devices, and gray scale means including fixed magnitude signal means for selectively energizing individual ones of said display devices to cause said individual devices to scatter light, each of said devices providing different predetermined levels of light scattering when energized by said gray scale means.

2. A display according to claim 1 wherein said display devices each comprise first and second sets of conductors having liquid crystal material disposed therebetween, said liquid crystal material of each of said display devices being of different predetermined thickness relative to one another.

3. A display according to claim 1 wherein each of said display devices comprise different liquid crystal material.

4. A display according to claim 1 wherein said gray scale means includes means for applying a like magnitude signal in common to selected ones of said display devices.

5. A display device comprising a plurality of liquid crystal display levels, each of said display levels being of different predetermined thickness relative to one another, and means for selectively exciting individual ones of said display levels with a common signal for causing said individual ones of said display levels to scatter light.

6. A display comprising a plurality of layers of liquid crystal material, a plurality of sets of conductors interleaved with said layers and arranged so as to define respective arrays of cross-point cells with each of said layers, and means for applying predetermined magnitude signals to individual ones of said cells.

7. A display according to claim 6 wherein $n$ arrays of said cross-point cells are defined by $n+1$ sets of conductors interleaved with said layers of liquid crystal material, the cells of each array being substantially in registration with corresponding cells of other ones of said arrays.

8. A display according to claim 7 wherein each of said layers comprises a layer of dielectric material having an array of holes disposed therein containing liquid crystal material, said conductors being arranged so as to define respective cross-point cells with each of said holes.

9. A display comprising a stack of display devices individually including first and second conductors separated by liquid crystal material, said liquid crystal material of each of said display devices being of different predetermined thickness relative to said liquid crystal material of the other of said devices, such that with like magnitude electrical fields applied thereto each said device exhibits different predetermined degrees of light scattering.

10. A display comprising a stack of $n$ display cells arranged substantially in registration with one another, each of said cells including a pair of conductors with liquid crystal material disposed therebetween, such that a $2^n$ level gray scale is provided by energizing selected combinations of said cells with fixed magnitude signals.

11. A display according to claim 10 wherein said liquid crystal material of each of said cells is respectively of different predetermined thickness, such that with like magnitude signals applied thereto each of said cells in said stack provides a different predetermined level of light scattering, said different levels differing from one another by substantially like factors.

12. A display according to claim 10 wherein said liquid crystal material is of different composition for each of said cells in said stack, such that with like magnitude signals applied thereto each said cell provides a different predetermined level of light scattering, said different levels differing from one another by substantially like factors.

* * * * *